Feb. 10, 1931.     A. WIDMANN ET AL     1,791,991
INTERNAL COMBUSTION ENGINE
Filed May 17, 1929     2 Sheets-Sheet 1

Inventors
Adolph Widmann
Lionel M. Woolson
By
Attorneys

Patented Feb. 10, 1931

1,791,991

UNITED STATES PATENT OFFICE

ADOLPH WIDMANN AND LIONEL M. WOOLSON, OF DETROIT, MICHIGAN, ASSIGNORS, BY DIRECT AND MESNE ASSIGNMENTS, TO PACKARD MOTOR CAR COMPANY, OF DETROIT, MICHIGAN, A CORPORATION OF MICHIGAN, AND UNION GUARDIAN TRUST COMPANY, OF DETROIT, MICHIGAN, A CORPORATION OF MICHIGAN, AS TRUSTEE

INTERNAL-COMBUSTION ENGINE

Application filed May 17, 1929. Serial No. 363,818.

The invention relates to internal combustion engines of the general type known as Diesel, characterized by the injection of the fuel separate from the air directly into the combustion chamber and the automatic ignition of the fuel by the heat of high compression. With such constructions where the air is compressed between parallel surfaces of the piston and cylinder head the clearance between these surfaces is, on account of the high compression, relatively small and consequently the form of the chamber is not favorable to most efficient operation. Furthermore, the injection of the fuel into this restricted clearance space will cause impingement against the piston, causing a pitting of the same. For high speed operation it is important to reduce to the mimimum the resistance to the incoming air as well as to the expulsion of the exhaust and it is equally important to obtain a rapid and thorough commingling of the fuel is a highly divided state with the compressed air. This has heretofore been accomplished by the admission of air through a passage having a rectilinear axis inclined to the axis of the cylinder and at one side thereof, so as to impart to the incoming air a spiral movement of high velocity within the engine cylinder. Such an arrangement requires a cylinder head having a flat inner surface and a seat for the valve substantially flush with this surface.

It is the object of our invention to avoid the pitting action by the injected fuel and further to obtain a more efficient form of combustion chamber without interference with either the free admission of air into the cylinder or the imparting of high rotational velocity thereto.

Still further it is an object to provide sufficient clearance for the valve so that it may remain open when the piston is in closest proximity thereto, this being desirable in the portion of the cycle including exhaust and admission. These objects are accomplished by the peculiar construction of piston as hereinafter set forth.

Figure 1:
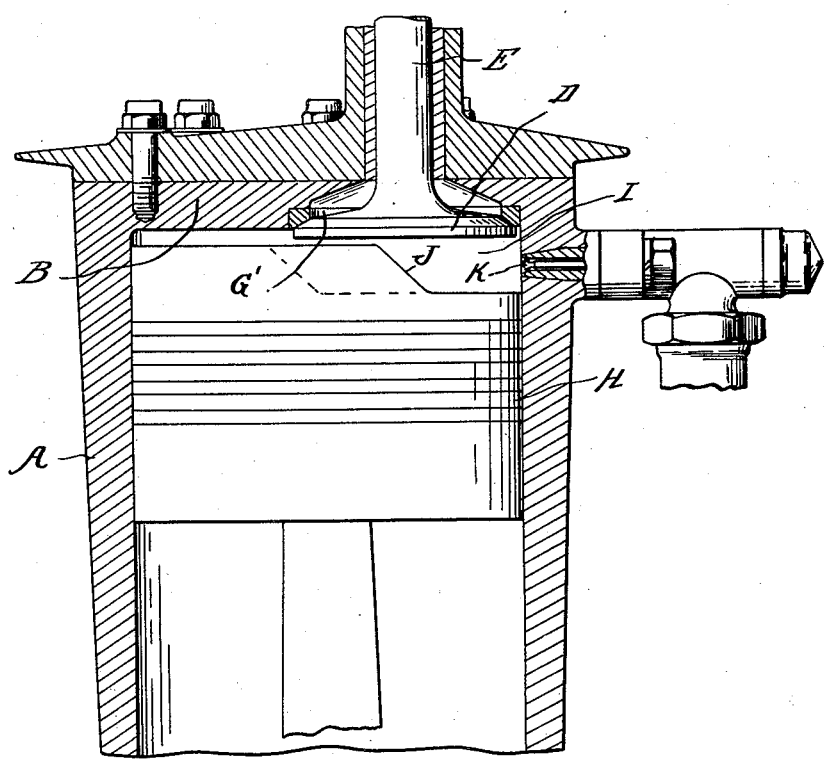
Figure 1 is a central longitudinal section through the cylinder and piston in the plane of the wrist pin axis.
Figure 2:
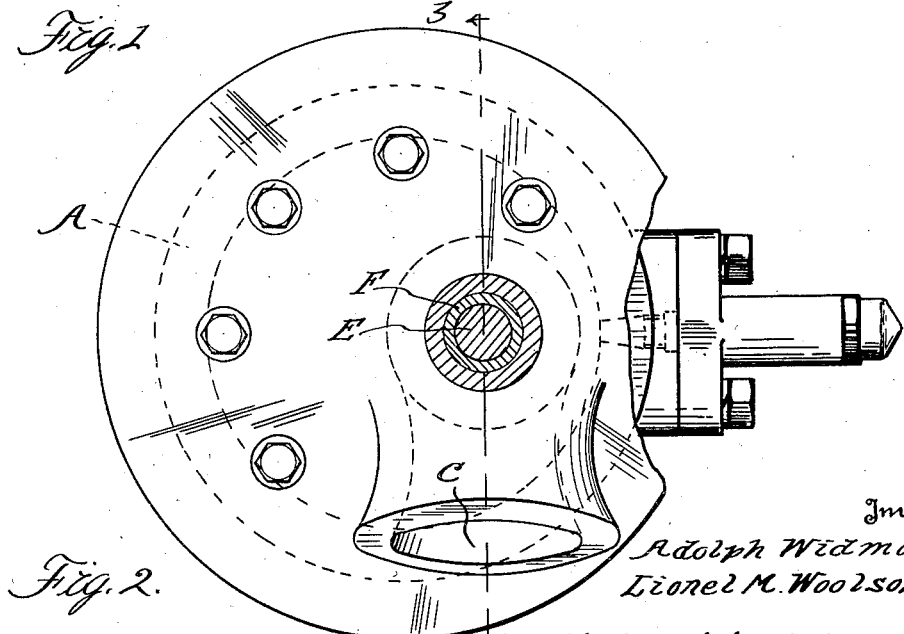
Figure 2 is a plan view of the cylinder head.
Figure 3:
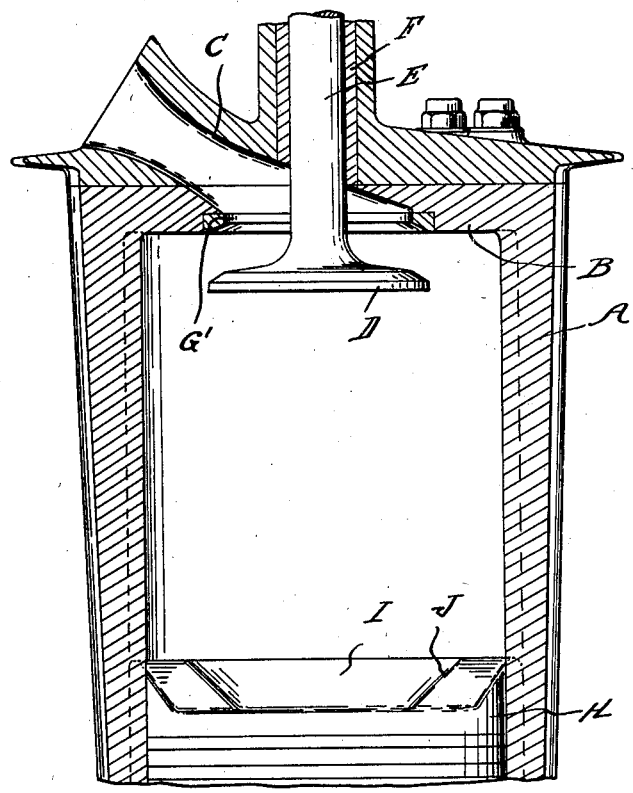
Figure 3 is a cross section on line 3—3 of Figure 2.

The engine cylinder A of any suitable construction is provided with a head B with a combined inlet and exhaust passage C extending therethrough. As shown, this passage has a rectilinear axis which is inclined to the axis of the cylinder and is arranged at one side thereof. Also the port opening into the cylinder is of a diameter approximating the radius thereof so that the air admitted through the passage will be directed in a spiral. The passage C is preferably of Venturi form which both reduces resistance to the incoming and outgoing currents as well as imparting a high velocity thereto. The valve D has a stem E extending outward through a bearing F in the head and a seat for the valve is arranged substantially flush with the inner face of the head. Thus when the valve is open it will offer but slight resistance to the incoming or outgoing stream.

With the parts as thus far described, if the piston were provided with a flat head parallel with the head of the cylinder the clearance between the same under high compression would be very slight and would neither permit of the valve remaining open or provide for the injection of the fuel without impingement against the piston. To avoid such difficulty, we have modified the shape of the piston H so as to form a pocket I substantially concentric with the valve port G' and of a diameter but slightly in excess of that of the valve. On its outer side this pocket extends to the periphery of the piston and on its inner side has a segmental wall J which is bevelled and at such an inclination as to avoid interference with rotational movement of the air within the cylinder. The fuel injection nozzle K is arranged to direct the fuel stream radially of the cylinder and in the central plane of the pocket I. The jet aperture is also preferably arranged midway between the valve and the bottom of the pocket. This fuel injection nozzle is of suitable construction for injecting the fuel at high pressure in the form of a highly divided spray but the specific construction used forms no part of the present invention and will therefore not be described in detail.

With the construction as described in operation during the suction stroke of the piston the valve D is opened by suitable mechanism (not shown) so as to permit the suction induced air stream to enter the cylinder at high velocity and to rotate in a spiral course therein. During the compression stroke the valve D being closed the air within the cylinder still rotating is compressed and during compression the fuel is injected through the nozzle K. The rotation of the air during the early part of the compression stroke is about the axis of the cylinder but as the piston approaches its high compression position the axis of rotation will be transferred to the axis of the pocket J. Thus the final portion of the fuel charge is directed radially of this pocket where it will be caught in the swirl and thoroughly commingled with the air. The form of the combustion chamber because of its increased depth and reduced surface area is much more efficient than a chamber having the full diameter of the cylinder.

After the power stroke the valve D being opened may remain open throughout the entire period of exhaust and succeeding period of intake, the pocket D providing sufficient clearance for this.

What we claim as our invention is:

1. In an internal combustion engine, the combination with a cylinder, and a head therefor having a substantially flat inner face, of a piston having a portion of its upper face parallel to said head and travelling in close proximity thereto, said piston having a pocket of lesser diameter and open to the periphery on one side and means for injecting fuel into the cylinder and pocket through the open side thereof.

2. In an internal combustion engine, the combination with a cylinder and a head therefor having a port eccentric to the cylinder axis of an inwardly opening valve for closing said port, a piston having a pocket in its upper face forming a clearance space of lesser diameter than the cylinder and registering with said valve to provide mechanical clearance therefor, and means for injecting fuel into said cylinder directly to said pocket.

3. In an internal combustion engine, the combination with a cylinder and a head therefor having a single port for inlet and exhaust arranged eccentric to the axis of the cylinder and a passage connecting said port having a rectilinear axis oblique and at one side of the axis of said cylinder, an inwardly opening valve for closing said port, a piston having a pocket in its upper face registering with said valve and providing mechanical clearance therefor and the greater portion of the compression space, said pocket being open to the periphery on one side with a bevelled wall on its opposite side to avoid interference with rotational movement of the compressed gases and means for injecting the fuel into the cylinder and into said pocket from the open side thereof.

4. The method of operating internal combustion engines provided with a clearance space of lesser diameter than the cylinder eccentric to the axis thereof comprising the direction of a suction induced air stream in a spiral course within the cylinder to impart a high rotational velocity thereto, the compression of the air so admitted while still rotating into said clearance space, and the injection of fuel radially into said clearance space.

5. In an internal combustion engine, the combination with a cylinder, of a head therefor having a single port eccentric to the axis of the cylinder and provided with a conecting passage having a rectilinear axis inclined to and at one side of the axis of the cylinder, said passage being of Venturi form, an inwardly opening valve for closing said port, a piston having a pocket in its upper face registering with said valve and providing mechanical clearance therefor, and a compression space of lesser diameter than the cylinder, and means for injecting fuel radially into the cylinder and into said compression space whereby the rotation imparted to the suction induced spirally directed air stream is continued in the pocket of smaller diameter to effect a thorough commingling with the injected fuel.

In testimony whereof we affix our signatures.

ADOLPH WIDMANN.
LIONEL M. WOOLSON.